United States Patent [19]
von Holdt

[11] 4,286,766
[45] Sep. 1, 1981

[54] COLLAPSIBLE MOLD CORE

[76] Inventor: John W. von Holdt, 7430 N. Croname Rd., Niles, Ill. 60648

[21] Appl. No.: 141,399

[22] Filed: Apr. 18, 1980

[51] Int. Cl.³ ............................................ B29C 7/00
[52] U.S. Cl. ........................................ 249/144; 249/58; 249/178; 249/184; 425/DIG. 218; 425/DIG. 58; 425/438; 425/597
[58] Field of Search ............... 249/58, 180, 184, 142, 249/144, 178, 186; 425/393, DIG. 218, 403

[56] References Cited

U.S. PATENT DOCUMENTS

| | | | |
|---|---|---|---|
| 2,948,031 | 8/1960 | Webb | 249/180 X |
| 3,248,756 | 5/1966 | Mills et al. | 249/180 X |
| 3,339,242 | 9/1967 | Lamb | 249/180 X |
| 3,373,460 | 3/1968 | Ladney | 249/180 X |
| 3,677,684 | 7/1972 | Platz | 425/393 |
| 3,865,529 | 2/1975 | Guzzo | 249/180 X |
| 4,019,711 | 4/1977 | Altenhof et al. | 249/184 X |
| 4,107,249 | 8/1978 | Murai et al. | 425/393 X |
| 4,125,246 | 11/1978 | von Holdt | 249/144 X |

*Primary Examiner*—J. Howard Flint, Jr.

*Attorney, Agent, or Firm*—Charles F. Pigott, Jr.; Garrettson Ellis

[57] ABSTRACT

A collapsible mold core comprises an inner core member defining opposed first and second ends. The inner core member tapers transversely to a reduced diameter from the first to the second end. A plurality of outer core members are attached to the lateral exterior of the inner core member in longitudinally slidable relation to it between first and second sliding positions. The outer core members define first and second ends corresponding in position to the first and second ends of the inner core member, with the outer core members tapering inwardly in transverse dimension from their second to their first ends to provide an opposite taper to that of the inner core member. The mold core is of lesser transverse diameter in the second sliding position than in the first sliding position. This permits the molding of an object such as a straight-walled bucket having an inwardly-projecting lip about the mold core while it occupies the first sliding position. Thereafter, removal of the object from the core can be accompanied with the transfer of the mold core to the second sliding position, permitting the removal of the bucket from the core.

11 Claims, 16 Drawing Figures

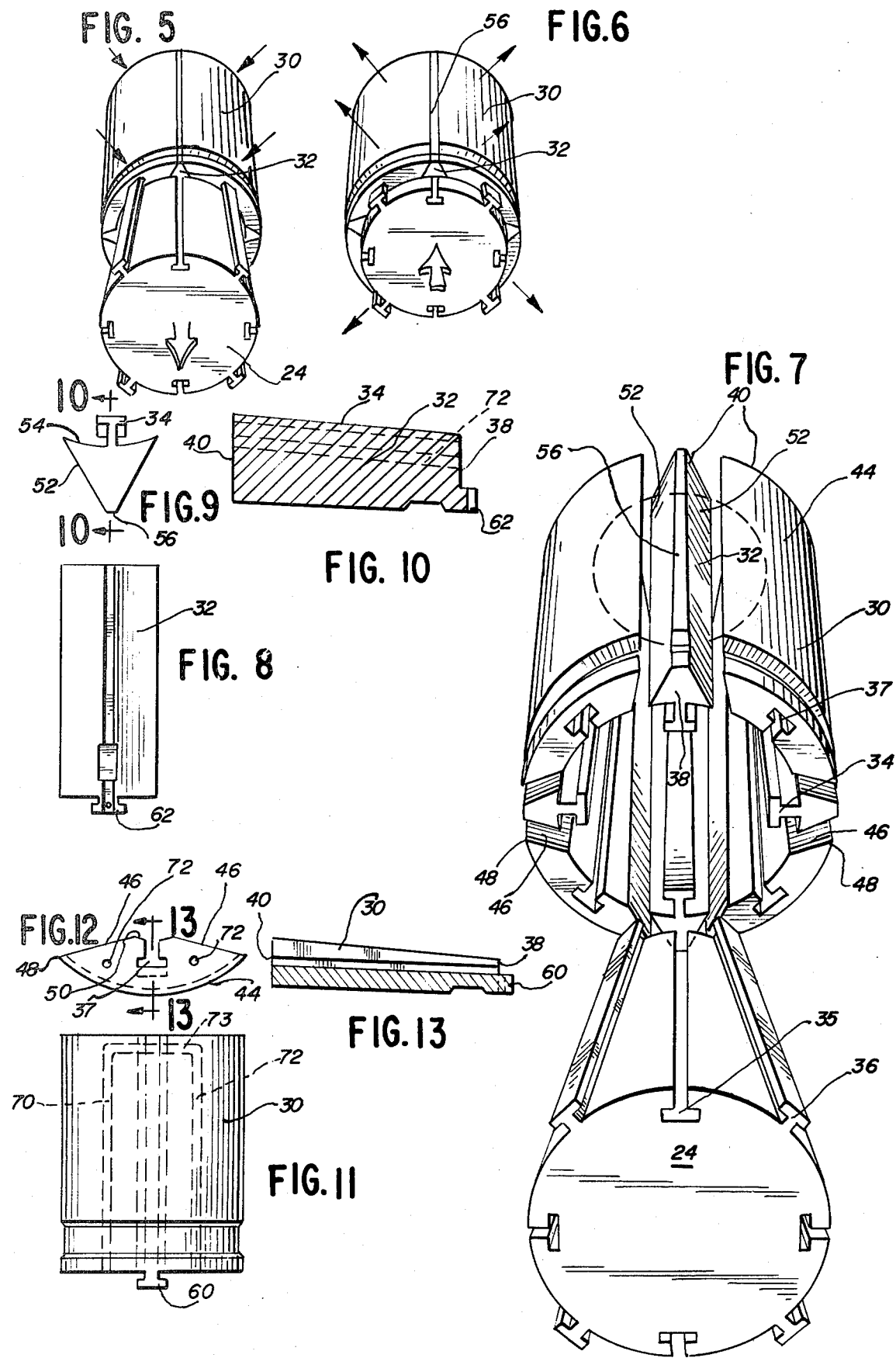

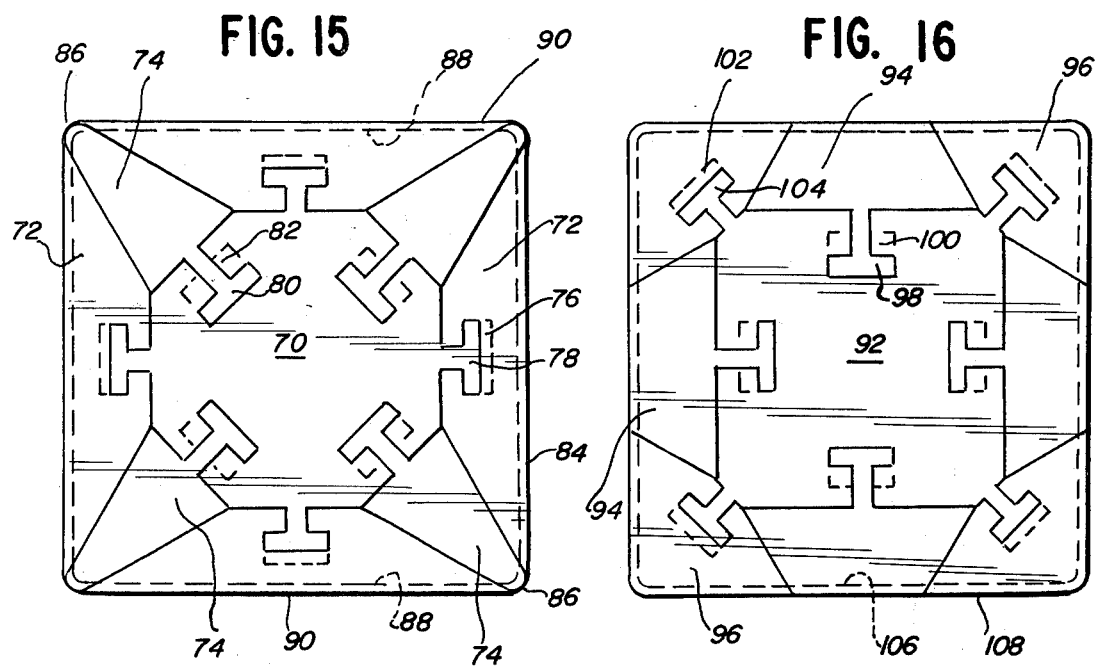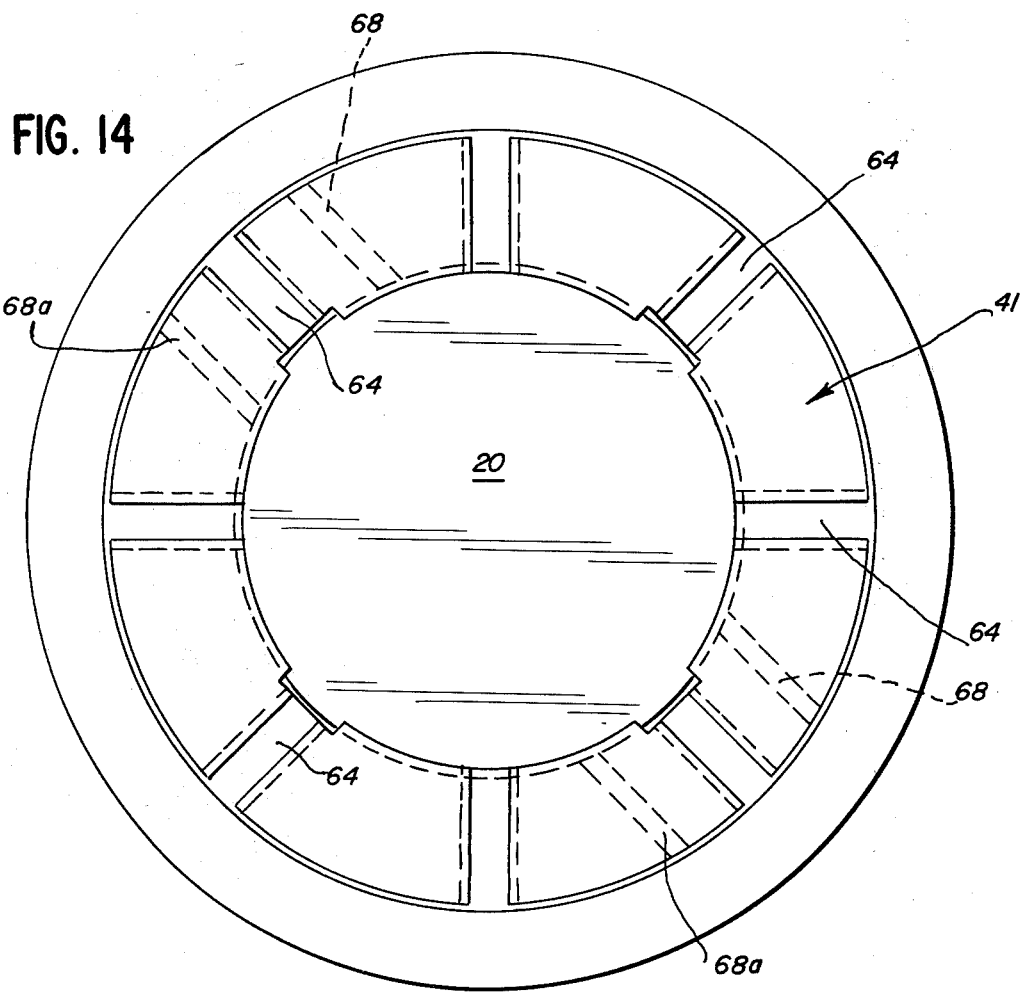

COLLAPSIBLE MOLD CORE

BACKGROUND OF THE INVENTION

This application relates to a collapsible mold core which permits the manufacture of straight-walled buckets, for example, in which the bucket lip has an inwardly-projecting rim that would seriously interfere with the removal of the bucket from a non-collapsible core. In a molding process, the mold core is fitted within a mold cavity to define the inner surface of the mold cavity, with the outer surface being defined by a conventional mold half for buckets, or any other hollow item which may be desired to be molded. Various designs of molded buckets and the like have inwardly-projecting members. These create problems relative to the removal of the molded bucket from the core which may be solved by the use of the collapsible core of this invention.

The collapsible core of this invention may also be used for molding of other hollow structures having inwardly-projecting members which create problems in the removal of the molded item from the core.

DESCRIPTION OF THE INVENTION

In accordance with this invention, a collapsible mold core is provided which comprises an inner core member defining opposed first and second ends, in which the inner core member tapers transversely to a reduced diameter from the first end to the second end.

A plurality of outer core members are attached to the lateral exterior of the inner core member in longitudinally slidable relation thereto between first and second sliding positions. The outer core members define first ends and second ends which correspond in position to the first and second ends of the inner core member, with the outer core members preferably tapering radially inwardly in transverse dimension from their second toward their first ends, to provide an opposite taper to that of the inner core member.

As the result of this, the collapsible mold core may be of lesser transverse diameter in the second sliding position than in the first sliding position. The effect of this is to permit molding of an object about the mold core in the first sliding position, and the subsequent removal of the object from the core by movement of the mold core into its second sliding position, permitting any inward projections which have been molded into the object by the mold core to clear the mold core upon removal.

Typically, the mold core members are movable from their second to their first sliding positions by the opening of the mold halves of which the mold core is a part. The newly hardened molded object and outer core members are urged by a stripper plate means to move, upon the opening of the mold, in the direction of the second end of the inner and outer core members. The outer core members move with the molded object along their longitudinally slidable paths of motion from the first position toward the second position, moving inwardly as described to reduce the transverse dimension of the mold core. When the outer core members have moved inwardly an amount sufficient to allow the molded object to clear them and be removed from the core, the molded object can be removed. Then the stripper plate means can move the outer core members back to their first position for another molding operation.

Typically, the outer side walls of the collapsible mold core, defined by outer surfaces of the outer core mebers, are generally parallel to the longitudinal axis of the mold core in the first position. For example, the outer side walls of the mold core may be of generally cylindrical shape, to permit the molding of a straight-walled bucket.

The outer core members may include first outer core members defining an arcuate, typically convex outer surface. The outer core members also may define converging inner surfaces, connected at their edges to lateral edges of the outer surface to define acute angles thereto. The first outer core members are spaced from each other in the first sliding position.

Second outer core members may be positioned between each of the first outer core members, with the second outer core members being also of generally triangular cross section and defining a pair of inwardly-angled outer surfaces positioned in sliding relation with inner surfaces of adjacent first outer core members.

The second outer core members each define an arcuate, concave inner surface positioned in sliding relation with the inner core, while inwardly-angled faces define acute angles with the arcuate inner surface.

It is also preferable for the second outer core members to each define an arcuate apex surface positioned between outer edges of the inwardly-angled outer surfaces, and opposed to the arcuate inner surface. The arcuate outer surfaces of the first outer core members and the arcuate apex surfaces of the second outer core members collectively define, in the first sliding position, the preferably cylindrical or rectangular outer side walls of the mold core.

Key and key-way means can provide longitudinal sliding attachment between the inner core member and the outer core members. It is desirable for the slope of the key and key-way means of the second outer core members, relative to the longitudinal axis of the mold core, to be greater than the slope of the key and key-way means of the first outer core members but no more than the slope of the side walls of the inner core member, relative to the longitudinal axis of the mold core. The result of this is that, upon movement of the outer core members from the first toward the second sliding position, the second outer core members move more rapidly inwardly than the first outer core members. This separation of the first and second outer core members permits easy motion of the outer core members from their first to their second positions.

Referring to the drawings,

FIG. 5 is a fragmentary perspective view of the mold core of this invention shown in the second sliding position of FIGS. 3 and 4.

FIG. 6 is a fragmentary perspective view of the mold core of this invention with the respective members thereof in their first sliding position, as shown in FIGS. 1 and 2.

FIG. 7 is an exploded perspective view of the mold core of this invention.

FIG. 8 is a plan view of one of the outer mold core members of this invention.

FIG. 9 is an end elevational view of the member of FIG. 8.

FIG. 10 is a longitudinal sectional view taken along line 10—10 of FIG. 9.

FIG. 11 is a plan view of the other of the outer core members of FIG. 7.

FIG. 12 is an end elevational view of the core member of FIG. 11.

FIG. 13 is a longitudinal sectional view taken along line 13—13 of FIG. 12.

FIG. 14 is a transverse sectional view taken along line 14—14 of FIG. 2.

FIGS. 15 and 16 are transverse sectional views of alternative embodiments of the mold core of this invention showing how collapsible cores of rectangular cross section may be produced.

Figure 2:
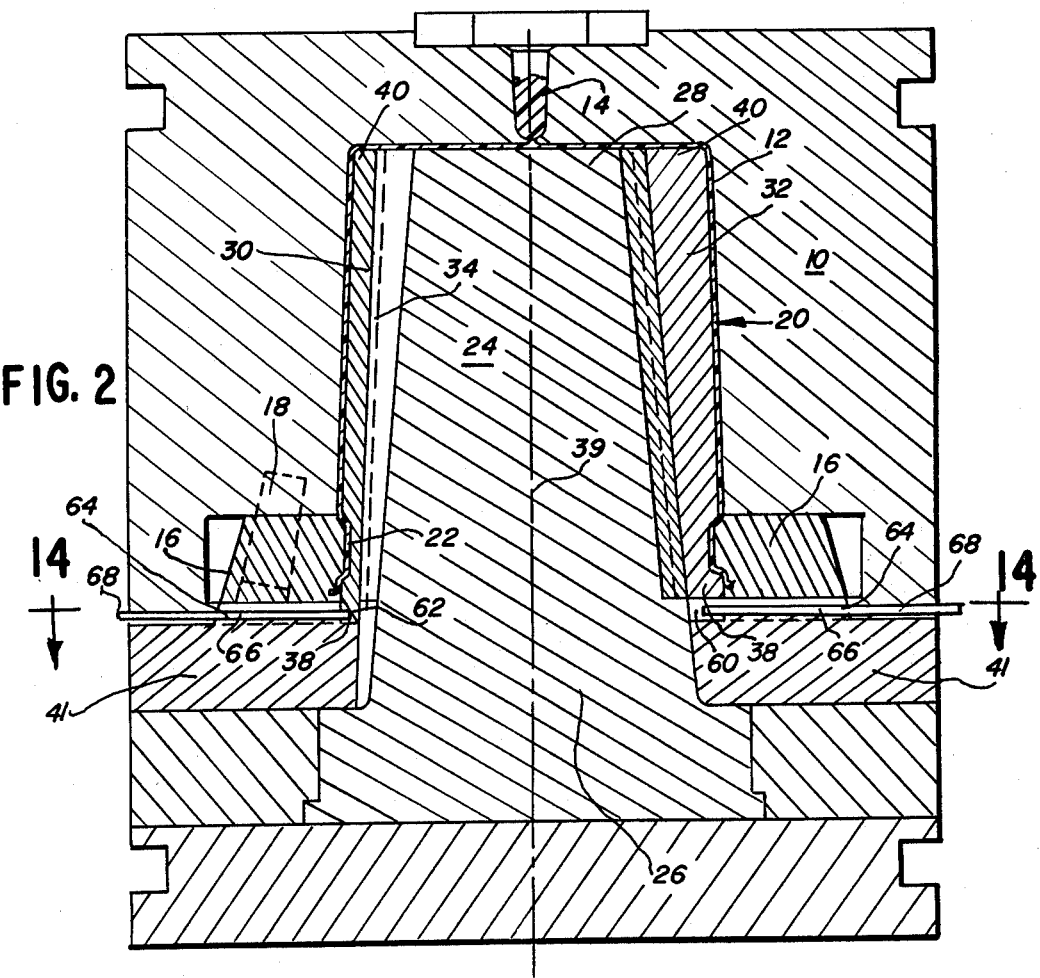
FIG. 2 is a longitudinal sectional view of the mold of FIG. 1 taken along line 2—2 of FIG. 1.
Figure 3:
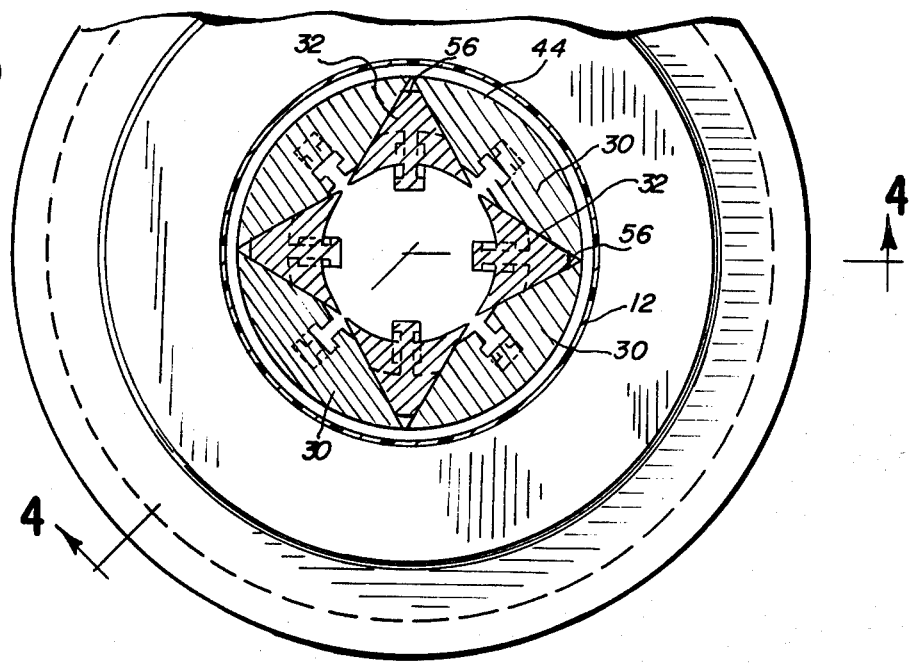
FIG. 3 is a transverse sectional view of the mold of FIG. 1 in which the mold core is in its second, collapsed position.
Figure 4:
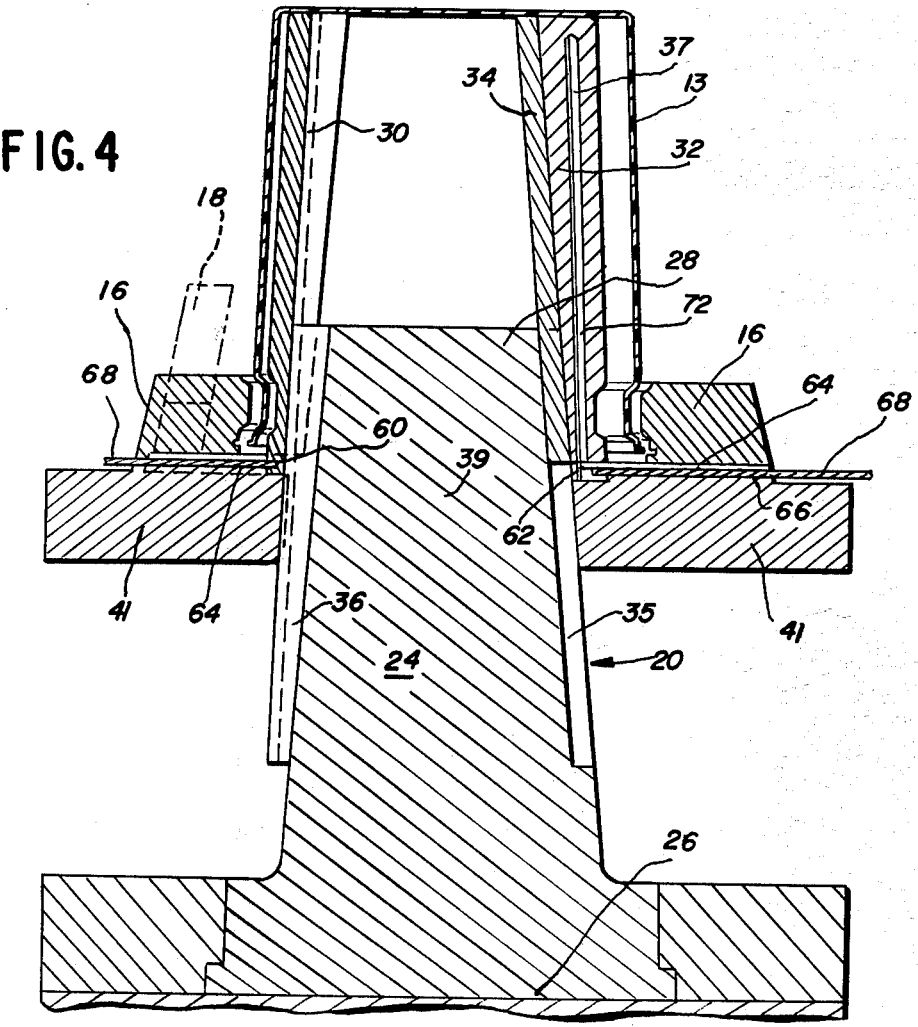
FIG. 4 is a longitudinal sectional view taken along line 4—4 of FIG. 3.

Referring to the drawings, and particularly FIGS. 1 through 4, an injection mold system for a bucket is shown which is of conventional design except as otherwise described herein. Outer mold half 10 is provided to form the outer portion of a mold cavity 12 which is shown to contain a freshly-molded plastic bucket 13 (FIG. 4).

Outer mold half 10 also includes a molding compound inlet port 14, and a split ring 16 of conventional design for molding the outer lip of the bucket in mold cavity 12 as shown. Split ring 16 is conventionally opened and closed automatically by diagonal core pins 18, which cause split ring 16 to move outwardly as outer mold half 10 moves upwardly, to release the bucket in cavity 12.

Mold core 20, in accordance with this invention, is of the collapsible type, to permit the indented, annular portion 22 of a bucket formed in cavity 12 to clear the collapsed core 20 upon opening of the mold.

Mold core 20 comprises an inner core member 24 defining opposed first end 26 and second end 28. As can be seen from FIGS. 2 and 4, inner core member 24 tapers transversely to a reduced diameter from the first end 26 to the second end 28.

Also, a plurality of outer core members 30, 32, preferably of two distinct types, are attached to the lateral exterior of inner core member 24 in longitudinally slidable relation thereto by means of key members 34, 36 which fit in keyways 35, 37. Outer core members 32 carry keys 34 as shown, fitting within a keyway 35 defined in tapered inner core 24. The converse is true with respect to outer core members 30, which define keyways 37, with a key 36 projecting outwardly from core 24, to provide alternatively outwardly projecting and inwardly projecting keys for correspondingly positioned keyways.

Outer core members 30, 32 define first ends 38 and second ends 40 corresponding in position to the first and second ends 26, 28 of inner core member 24.

The outer core members 30 and 32, however, preferably taper inwardly in radial transverse dimension from their second ends 40 toward their first ends 38, as particularly shown in FIGS. 10 and 13, to provide an opposite taper to that of inner core member 24. The result of this is that when the sliding outer core members 30, 32 occupy a second sliding position of minimum area contact with inner core 24 (as shown in FIG. 4), mold core 20 is of lesser transverse diameter than in the first sliding position in which the outer core members 30 and 32 have maximum area contact with inner core member 24, as shown in FIG. 2. Thus the molding process takes place in the configuration of FIG. 2, followed by removal of the bucket or other item formed in mold cavity 12 by opening of the mold. Stripper ring 41 may be hydraulically, pneumatically, or mechanically operated to move the molded bucket and outer core members 30 and 32 toward the second sliding position until the diameter of collapsible core 20 is reduced enough to cause disengagement from bucket 13, as in FIG. 4. Bucket 13 may then be removed, and members 30 and 32 moved by ring 41 back into their original position as shown in FIG. 2.

Core 20 can define outer side walls which are generally cylindrical in shape to form a straight-walled bucket if desired, by appropriate adjustment of the taper of the core parts 24, 30 and 32.

Figure 1:
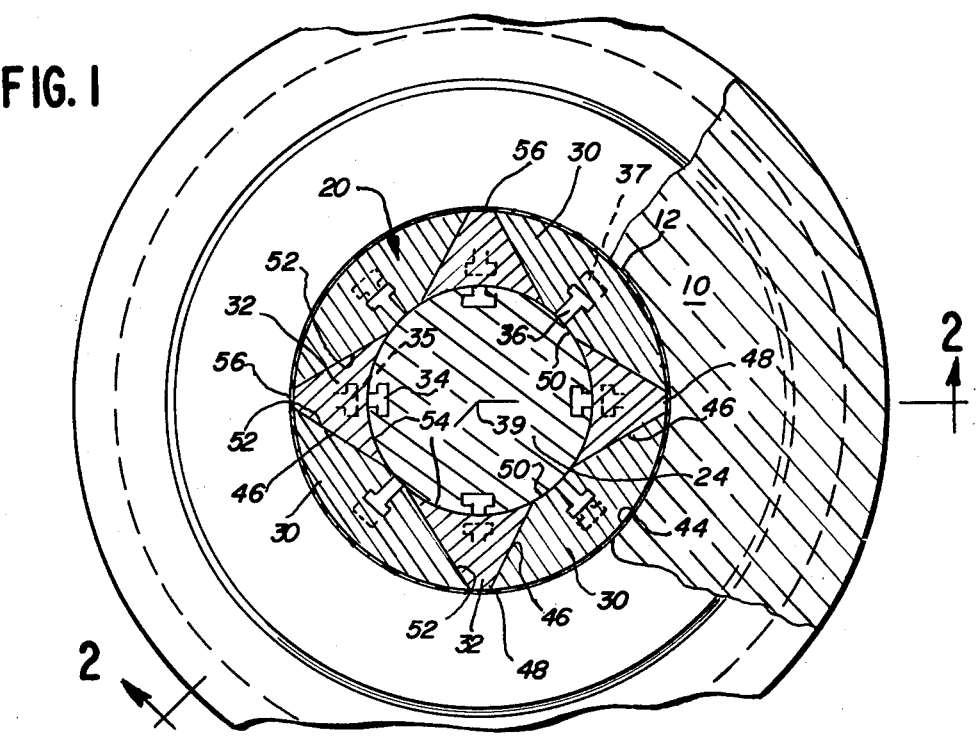
FIG. 1 is a transverse sectional view of the mold core of this invention, positioned in an outer mold half, and shown in the process of molding a bucket.

The first outer core members 30 define an arcuate outer surface 44, plus converging inner surfaces 46 connected at their edges 48 to lateral edges of outer surface 44, and defining acute angles to each other, as shown in FIG. 1. The first outer core members 30 are spaced from each other in the first sliding position. The keyway 37 defined in first outer core members 30 is positioned on the inner surface 50 of members 30 between converging edges 46. Inner surfaces 50 are opposed to outer surfaces 44. Inner surfaces 50 may also be arcuate and concave to fit the contour of inner core member 24.

Keyway 35, and the corresponding key 34 of second outer core member 32, may have a greater radial slope relative to the longitudinal axis 39 of mold core 10, relative to the keyway 37 and key 36 of the first outer core member 30. Accordingly, upon movement of the outer core members from the first toward the second sliding position, the second outer core members 32 move more rapidly radially inwardly than the first outer core members 30, to facilitate the ease of collapse of the core of this invention.

The slope of keyways 35, 37, and their corresponding keys, relative to the longitudinal axis 39 of the collapsible mold, must be no more than the slope of the outer side walls of inner core member 24, to permit the outer core members 30, 32 to move freely inwardly at the differing rates created by the differing angles of the respective keyways 35, 37. For example, the slope of the outer walls of inner core member 24 to the longitudinal axis 39 may be 5°, while the slope of keyway 35 to the same axis is 5°, and the slope of keyway 37 to axis 39 is 2½°. As used herein, the term "slope" means the angle defined between longitudinal axis 39 and the respective keyways, or the outer wall of the inner core member 24.

The second outer core members 32 are positioned between first outer core members 30, the second outer core members being in this embodiment of generally triangular cross section as shown, and defining a pair of inwardly angled outer surfaces 52 positioned in sliding relation with the inner surfaces 46 of the adjacent first outer core members 30.

Second outer core members 32 each define an arcuate, concave inner surface 54 positioned in sliding relation with inner core 24. The inwardly angled outer surfaces 52 define acute angles with the arcuate inner surface 54.

Second outer core members 32 also each define an outer arcuate apex surface 56, positioned between the outer edges of inwardly angled outer surfaces 52. Surfaces 56 form part of the outer circumference of mold core 20 in the first position, but then are retracted inside of outer arcuate surfaces 44 of the first outer core members 30 when occupying a second position, as shown in FIG. 3. This provides room for the outer core members 30 to be brought together, if necessary to a position where their edges are tangent as shown in FIG. 3, which is the inner extreme of collapse of the core of this invention.

Each of first and second outer core members 30, 32 may define a generally T-shaped key member 60, 62 at their ends (FIGS. 8 and 11) for engagement in keyways 64, which keyways are positioned in the upper surface of stripper ring 41.

Split ring portion 16 may also define keys 66 positioned in the same radially positioned keyways 64, to permit the radial opening and closing motion of split rings 16, and to retain outer core members 30, 32 in secure relation to stripper ring 41.

Cooling lines 68 proceed radially across stripper ring 41 for communication adjacent one end of the outer core members 30, 32, for communication with cooling liquid conduits 70, 72 in core member 30 to facilitate cooling of the mold core during operation.

Preferably, conduits 70, 72 of outer mold core member 30 join together at their inner end to form conduit 73, so that water may be circulated through the mold core part through the conduits, via cooling lines 68 which connect to conduits 70, 72. The smaller outer core members 32 may be free of cooling liquid flow conduits.

Referring to FIG. 15, another embodiment of mold core is provided of analogous design to the previous embodiment, but showing a collapsible core of rectangular and specifically square cross section.

The inner core 70 is of octagonal cross section and radially tapered as in the previous embodiment. Core 70 carries two different types of outer core members 72, 74, which may also radially taper in a manner analogous to the previous embodiment. Outer core members 72 are shown to define a keyway 76, which carries a key 78 of generally T-shaped cross section which is in an integral part of inner mold core 70.

The outer mold core members 74 carry a key 80 which fits within keyways 82 of inner core member 70.

Outer core members 72 in this instance define a flat outer wall 84, while outer core members 74 define the corner edges 86 of the rectangular cross section of the mold core.

The slope of keyways 82 and the corresponding keys 80 is greater than the slope of keyways 76 and the corresponding keys 78, but no more than the amount of core taper, as previously described. Accordingly, as the outer core members are moved longitudinally from their first sliding position to a second sliding position analogous to those of the previous embodiment, outer core members 74 will slide inwardly more rapidly than outer core members 72 because of the increased slope of keyway 82. This permits the initial increased retraction of outer core members 74, followed by a retraction of outer core members 72, so that the mold core shown in FIG. 15 can acquire a reduced periphery 88 in the second position, and an increased periphery 90 in the first position of outer core members 72, 74.

FIG. 16 is a structure which is also analogous in operation to that of the previous embodiment. Here, a collapsible core is shown having an inner core 92 and outer core members 94, 96. In a manner analogous to previous embodiments, outer core members 94 define keys 98 which fit within keyways 100 defined by the inner core member 92. Outer core members 96 define keyways 102 in slidable relation with keys 104 defined by the inner core member 92.

As in the previous embodiments, keyways 100 of outer core member 94 exhibit a greater slope than the keyways 102 of outer core members 96, so that as the outer core members 94, 96 are moved from their first position to their longitudinally displaced second position in a manner analogous to the previous embodiments, outer core members 94 tend to break away from outer core members 96, moving inwardly more rapidly, to permit the collapse of the core to an outer periphery 106 shown in dotted line, which is smaller than the normal outer periphery 108 of the rectangular core in the first position of the outer core members 94, 96.

As a result of this structure, a simple, collapsible core member is provided for the molding of preferably straight-walled buckets and the like having inwardly-projecting portions and other structures as may be desired.

The above has been offered for illustrative purposes only, and is not intended to limit the invention of this application, which is as defined in the claims below.

That which is claimed is:

1. A collapsible mold core having cylindrical outer walls in its molding configuration, which comprises:
an inner core member of the general shape of a truncated cone defining opposed first and second ends, said inner core member tapering transversely to a reduced diameter from said first end to the second end, and a plurality of outer core members, attached to the lateral exterior of said inner core member in longitudinally slidable relation thereto between first and second positions, said outer core members defining first ends and second ends corresponding in position to the first and second ends of the inner core member, said outer core members tapering inwardly in transverse dimension from their second ends to their first ends, to provide an opposite taper to that of the inner core member, key and keyway means providing longitudinally sliding attachment between said inner core member and outer core members, said outer core members including first outer core members defining an arcuate outer surface and converging inner surfaces connected at their edges to lateral edges of the outer surface and defining acute angles thereto, said first outer core members being spaced from each other in the first sliding position and having an inner wall in intimate sliding contact with the inner core member, and second outer core members positioned between said first outer core members, said second outer core members being of generally triangular cross section and defining a pair of inwardly-angled outer surfaces positioned in sliding relation with inner surfaces of adjacent first outer core members, said second outer core members each defining an arcuate, concave inner surface positioned in sliding relation with said inner core member, said inwardly-angled outer surfaces defining acute angles with the arcuate inner surface, said second outer core members each defining an outer arcuate apex surface positioned between outer edges of the inwardly angled outer surfaces and opposed to the arcuate inner surface, the arcuate outer surfaces of the first outer core members and the arcuate apex surfaces of the second outer core members defining, in the first sliding position, the outer side wall of said mold core, said mold core being substantially free of open interior spaces between said inner and outer core members in the first sliding position whereby said mold core is of lesser transverse diameter in said second sliding position than in the first sliding position, to permit molding of a cylindrical object about the mold core in the first sliding position, and removal of the object from the core in the second sliding position.

2. The collapsible mold core of claim 1 in which said key and keyway means provide longitudinal sliding attachment between said inner core member and the outer core members, the slope of the key and keyway means of said second outer core members, relative to the longitudinal axis of the mold core, being greater than the slope of the key and keyway means of the first outer core members, and no more than the slope of the side walls of the inner core member, whereby, upon movement of the outer core members from the first toward the second sliding position, the second outer core members move more rapidly inwardly than the first outer core members.

3. The collapsible mold core of claim 2, in operative relation with a bucket mold cavity and adapted to make straight-walled buckets.

4. A collapsible mold core which comprises:
an inner core member defining opposed first and second ends, said inner core member tapering transversely to a reduced diameter from said first end to the second end, and the plurality of outer core members attached to the lateral exterior of said inner core member in longitudinally slidable relation thereto between first and second positions, said outer core members defining first ends and second ends corresponding in position to the first and second ends of the inner core member, said outer core members tapering inwardly in transverse dimension from their second ends to their first ends to provide an opposite taper to that of the inner core member, the outer side walls of said collapsible mold core defining a generally cylindrical shape in said first sliding position; said longitudinally slidable relation between the inner and outer core members being provided by key and keyway means; said outer core members including first outer core members defining a convex, arcuate outer surface, and converging inner surfaces connected at their edges to lateral edges of the outer surface and defining acute angles thereto, said first outer core members being spaced from each other in the first sliding position, and second outer core members positioned between said first outer core members, said second outer core members being of generally triangular cross section and defining a pair of inwardly-angled outer surfaces positioned in sliding relation with inner surfaces of adjacent first outer core members, said second outer core members also each defining an arcuate, concave inner surface positioned in sliding relation with said inner core, said inwardly-angled outer surfaces defining acute angles with the arcuate inner surface, to permit molding of an object about the mold core in the first sliding position, and removal of the object from the core in the second sliding position, said inner core member and outer core members being substantially free of internal open spaces between them in the first sliding position, longitudinally movable stripper ring means connected to said first outer core members, and cooling liquid conduit means carried by said stripper ring means and communicating through the interior of at least some of said outer core members to facilitate cooling of said mold core during operation.

5. The collapsible mold core of claim 4 in which said second outer core member each defines an outer arcuate apex surface positioned between outer edges of the inwardly-angled outer surfaces and opposed to the arcuate inner surface, the arcuate outer surfaces of the first outer core members and the arcuate apex surfaces of the second outer core members defining, in the first sliding position, the outer side walls of said mold core.

6. The collapsible mold core of claim 5, in operative relation with a bucket mold cavity and adapted to make straight-walled buckets.

7. The collapsible mold core of claim 4 in which key and keyway means provide longitudinal sliding attachment between said inner core member and the outer core members, the slope of the key and keyway means of said second outer core members, relative to the longitudinal axis of the mold core, being greater than the slope of the key and keyway means of the first outer core members and no more than the slope of the side walls of the inner core member, whereby, upon movement of the outer core members from the first toward the second sliding position, the second outer core members move more rapidly inwardly than the first outer core members.

8. A collapsible mold core which comprises:
an inner core member defining opposed first and second ends, said inner core member of the shape of a truncated cone, tapering transversely to a reduced diameter from said first end to the second end, and the plurality of outer core members attached to the lateral exterior of said inner core member in longitudinally slidable relation thereto between first and second positions, said outer core members defining first ends and second ends corresponding in position to the first and second ends of the inner core member, said outer core members tapering inwardly in transverse dimension from their second ends to their first ends to provide an opposite taper to that of the inner core member, the outer side walls of said collapsible mold core defining a generally cylindrical shape in said first sliding position; said longitudinally slidable relation between the inner and ouer core members being provided by key and keyway means; said outer core members including first outer core members defining a convex, arcuate outer surface, and converging inner surfaces connected at their edges to lateral edges of the outer surface and defining acute angles thereto, said first outer core members being spaced from each other in the first sliding position, and second outer core members positioned between said first outer core members, said second outer core members being of generally triangular cross section and defining a pair of inwardly-angled outer surfaces positioned in sliding relation with inner surfaces of adjacent first outer core members, said second outer core members also each defining an arcuate, concave inner surface positioned in sliding relation with said inner core, said inwardly-angled outer surfaces defining acute angles with the arcuate inner surface, to permit molding of an object about the mold core in the first sliding position, and removal of the object from the core in the second sliding position, said inner core member and outer core members being substantially free of internal open spaces between them in the first sliding position.

9. The collapsible mold core of claim 8 in which said second outer core members each define an outer arcuate apex surface positioned between outer edges of the inwardly-angled outer surfaces and opposed to the arcuate inner surface, the actuate outer surfaces of the first outer core members and the arcuate apex surfaces of the second outer core members defining, in the first sliding position, the outer side walls of said mold core.

10. The collapsible mold core of claim 9, in operative relation with a bucket mold cavity and adapted to make straight-walled buckets.

11. The collapsible mold core of claim 8 in which key and keyway means provide longitudinal sliding attachment between said inner core member and the outer core members, the slope of the key and keyway means of said second outer core members, relative to the longitudinal axis of the mold core, being greater than the slope of the key and keyway means of the first outer core members and no more than the slope of the side walls of the inner core member, whereby, upon movement of the outer core members from the first toward the second sliding position, the second outer core members move more rapidly inwardly than the first outer core members.

* * * * *